L. Planer,
Converting Motion,
№ 24,359. Patented June 7, 1859.
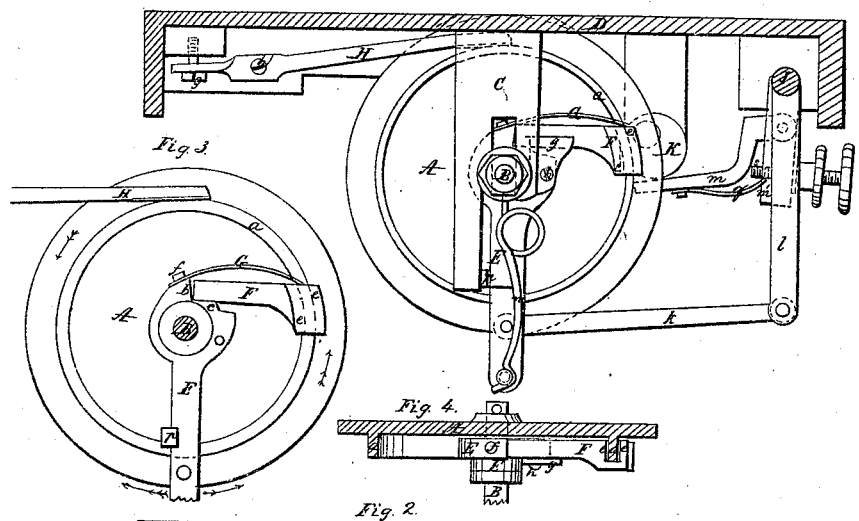
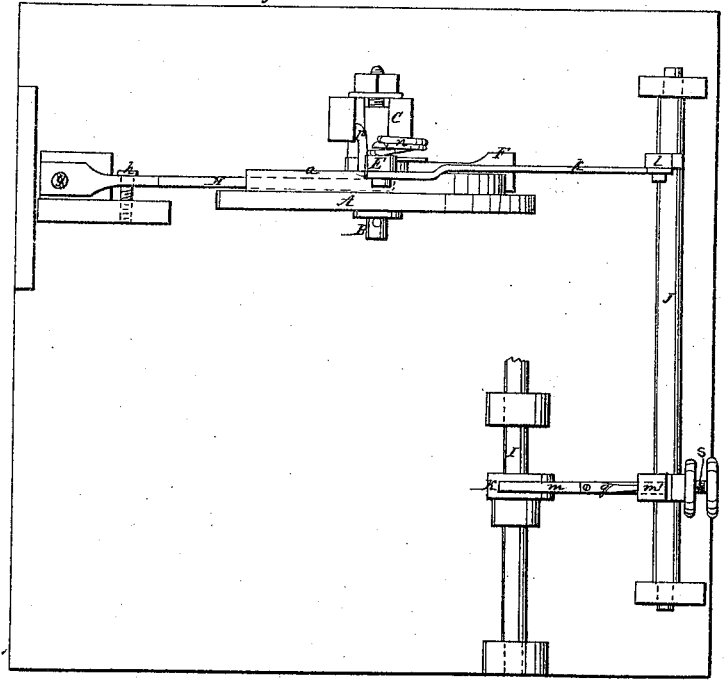
Witnesses:
R. S. Spencer
J. W. Coombs
Inventor:
Louis Planer

UNITED STATES PATENT OFFICE.

LOUIS PLANER, OF NEW YORK, N. Y., ASSIGNOR TO HIMSELF AND JOSEPH ANGER, OF SAME PLACE.

IMPROVEMENT IN MACHINES FOR CONVERTING OSCILLATING MOTION INTO DIRECT CIRCULAR MOTION.

Specification forming part of Letters Patent No. 24,359, dated June 7, 1859.

*To all whom it may concern:*

Be it known that I, LOUIS PLANER, of the city, county, and State of New York, have invented a new and Improved Device for Converting Alternate Circular or Oscillating Motion into Direct Circular Motion; and I do hereby declare that the following is a full, clear, and exact description of the same, reference being had to the accompanying drawings, forming part of this specification, in which—

Figure 1 is a front view of the feed apparatus of a sewing-machine, illustrating the application of my invention to turn the feed-wheel. Fig. 2 is an inverted plan of the same. Fig. 3 is a front view of the wheel and my improved device without any of the other parts of the apparatus. Fig. 4 is a horizontal sectional view of the same.

Similar letters of reference indicate corresponding parts in the several figures.

My invention consists in a certain novel arrangement of a dog, a lever, and a spring in combination with each other and with the smooth rim of a wheel, whereby an oscillating movement imparted to the lever by suitable means causes the dog to operate with very great certainty to turn the wheel in one direction only.

To enable others to make and apply my invention, I will proceed to describe its construction and operation.

A is the feed-wheel, to which a direct circular motion is to be given, furnished on one side with a square projecting rim, $a$, which is turned to make it smooth and perfectly concentric to the axle B, on which the wheel rotates. The said axle B is represented as being secured firmly to a rigid hanger, C, under the bed-plate D.

E is the oscillating lever, from which the direct circular motion of the wheel A is to be derived. This lever, which is fitted to move on the axle B as its fulcrum, is provided with an angular recess, $b\ c$, (best shown in Fig. 3,) to receive the tail of the dog F, the head of which is grooved, as shown at $e\ e$ in Figs. 1, 3, and 4, to fit easily to the projecting rim $a$ of the wheel, while the tail of the dog rests in the recess $b\ c$.

G is the spring, by which the operation of dog is governed, said spring being secured to the lever E by a screw, $f$, and applied to press upon the head of the dog on the opposite side of the dog to that which is supported in the recess $b\ c$ of the lever.

$g$ is a plate secured to the side of the lever E by a screw, $h$, for the purpose of confining the dog in place laterally. This plate $g$ is not, however, an important feature. Other contrivances might be substituted for it. For instance, the axle B might be provided with a flange to fit close to and cover up a portion of the dog. The said plate $g$ is omitted in Fig. 3 to expose the dog and the recess $b\ c$.

The operation of the lever E, the dog F, and spring G, in combination with each other, with the wheel and axle, are as follows: When the lever E is at rest, the spring G, by its pressure upon the head of the dog, keeps the tail thereof bearing upon the face $c$ of the recess in the lever. When the lever E is moved in the direction of the red arrow shown near it in Fig. 1, the support $c$ of the tail of the dog F, retiring from it, leaves it under the sole influence of the spring G, which, pressing upon it opposite to or near the groove $e\ e$, pushes it along the rim $a$ of the wheel without making it bite thereon, and so leaves the wheel stationary; but when the lever E is moved in the opposite direction to the pressure of the spring G, and thus tends to press the two corners $i\ j$ (see Fig. 3) of the groove $e\ e$ of the dog hard against the rim, and make them bite it so hard that the dog in moving with the lever will turn the wheel. By moving the lever E back and forth the wheel A is thus caused to have an intermittent but direct rotary motion.

H is a brake applied to the wheel A to prevent its being carried back by the slight friction of the dog when the lever E moves in the direction of the red arrow. This brake is supported by a vertical screw, $g$, and a horizontal screw, $h$, which attach it to the bed-plate, and which make it constitute a double-acting lever, for when the screw $g$ is screwed up the screw $h$ becomes a fulcrum, and when the screw $h$ is screwed up the screw $g$ becomes a fulcrum, and by properly adjusting the two screws the said brake may be made to act directly in the corner that is formed between the front face of the wheel A and the outer peripherical surface of its rim $a$.

I represents the main shaft of the sewing-machine, and J a rock-shaft for working the lever E, the said lever being connected by a rod, $k$, with an arm, $l$, on the said rock-shaft, and the said rock-shaft being furnished with another arm, $m$, which is acted upon by a cam, K, on the shaft I. $n$ is a spring for forcing back the lever E in the direction of the red arrow shown in Fig. 3 after the cam has given it the necessary movement in the direction of the black arrow, and $p$ is a stop-piece on the said lever, which comes in contact with the lower portion of the hanger C to stop the lever when it has moved back far enough. The arm $m$, before mentioned, is hinged to an arm, $m'$, that is rigidly attached to the rock-shaft J, and a spring, $q$, is applied between the said arms $m$ $m'$ in such a manner as to hold the said arm $m$ always in contnct with the cam K, and a screw, $s$, is screwed through the said arm $m'$, with its point toward the arm $m$. This arrangement of the hinged arm $m$, the spring $q$, and screw $s$ is to permit the movement of the lever E to be varied.

The arrangement of the lever E, dog F, and spring G, in combination with each other and with the wheel A and axle B, which constitute my invention, possesses the advantage over most other arrangements of devices of similar character of being more simple, while it is less likely to become inoperative by wear, and does not require so nice an adjustment to make it work infallibly.

What I claim as my invention, and desire to secure by Letters Patent, is—

The grooved dog F, having its tail resting in a recess, $b$ $c$, or equivalent resting-place in the lever E, without being pivoted or therwise attached thereto, and having a spring, G, applied in combination with it and the said lever, and the whole being applied and combined with the wheel A and its axle E, substantially as herein described.

LOUIS PLANER.

Witnesses:
R. S. SPENCER,
J. W. COOMBS.